United States Patent
You et al.

(10) Patent No.: US 11,536,605 B2
(45) Date of Patent: Dec. 27, 2022

(54) ELECTRONIC DEVICES WITH AN ALIGNMENT-FREE SPECTROMETER

(71) Applicant: Apple Inc., Cupertino, CA (US)

(72) Inventors: Sixian You, Sunnyvale, CA (US); Sheng Liu, San Jose, CA (US); Christopher M. Dodson, Denver, CO (US); Guocheng Shao, Campbell, CA (US); Mahdi Nezamabadi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/025,535

(22) Filed: Sep. 18, 2020

(65) Prior Publication Data

US 2022/0090964 A1 Mar. 24, 2022

(51) Int. Cl.
| | |
|---|---|
| *G01J 3/18* | (2006.01) |
| *G01J 3/02* | (2006.01) |
| *G01N 21/65* | (2006.01) |
| *G01J 3/44* | (2006.01) |
| *G01J 3/28* | (2006.01) |
| *G01J 3/14* | (2006.01) |

(52) U.S. Cl.
CPC ........... *G01J 3/0278* (2013.01); *G01J 3/0208* (2013.01); *G01J 3/0229* (2013.01); *G01J 3/14* (2013.01); *G01J 3/18* (2013.01); *G01J 3/28* (2013.01); *G01J 3/44* (2013.01); *G01N 21/65* (2013.01)

(58) Field of Classification Search
CPC ........ G01J 3/28; G01J 3/44; G01J 3/02; G01J 3/14; G01J 3/18; G01N 21/65
See application file for complete search history.

(56) References Cited

U.S. PATENT DOCUMENTS

| | | | |
|---|---|---|---|
| 7,061,609 B2 | 6/2006 | Cheng | |
| 7,684,037 B2 | 3/2010 | Harrison et al. | |
| 7,936,454 B2 | 5/2011 | Beardsley et al. | |
| 9,360,366 B1 * | 6/2016 | Tran ...................... | G01J 3/0256 |

(Continued)

OTHER PUBLICATIONS

Li et al., Towards a portable Raman spectrometer using a concave grating and a time-gated CMOS SPAD, Optics Express 22.15 (2014): 18736-18747.

*Primary Examiner* — Abdullahi Nur
(74) *Attorney, Agent, or Firm* — Treyz Law Group, P.C.; David K. Cole

(57) ABSTRACT

An electronic device such as a portable electronic device may include a single-shot alignment-free spectrometer with no moving parts. The spectrometer may include a diffractive member, such as a grating, an aperture, and an image sensor that generates data in response to incident light. The diffractive member may diffract the incident light based on its wavelength and angle of incidence, and the aperture may further encode the light. The data generated by the image sensor may be used by control circuitry in combination with correlations between spectrometer measurements and known light profiles to determine the wavelength and angle of incidence of the light. These correlations may be determined using a deep neural network. Control circuitry may adjust one or more settings of the electronic device based on the wavelength and angle of incidence, or may use the wavelength and angle of incidence to determine information regarding an external object.

20 Claims, 10 Drawing Sheets

(56) References Cited

U.S. PATENT DOCUMENTS

| | | | |
|---|---|---|---|
| 2007/0152154 A1* | 7/2007 | DeCamp | G01J 3/457 |
| | | | 250/339.07 |
| 2011/0261357 A1* | 10/2011 | Horiguchi | G01J 3/18 |
| | | | 356/328 |
| 2017/0358163 A1* | 12/2017 | Clara | G07D 7/1205 |
| 2018/0011334 A1* | 1/2018 | Zeitner | G02B 27/4244 |
| 2018/0149522 A1 | 5/2018 | Zhao | |
| 2018/0217066 A1* | 8/2018 | Nordberg | G01J 3/0229 |

* cited by examiner

ELECTRONIC DEVICES WITH AN ALIGNMENT-FREE SPECTROMETER

FIELD

This relates generally to electronic devices, and, more particularly, to electronic devices with optical sensors.

BACKGROUND

Electronic devices often include optical sensors to determine ambient light conditions or include optical sensors in combination with a light source to determine the amount of light reflected by a given medium. For example, spectrometers may be used to sense ambient light conditions or may be used to monitor patients in medical devices. It may be desirable to provide electronic devices with spectrometers to allow for detailed mapping of light, including the directionality and wavelength of the light. However, spectrometers are generally bulky and require precisely calibrated instruments that need specific alignments and moving parts to obtain accurate measurements.

SUMMARY

Electronic devices such as cellular telephones, wristwatches, and other portable electronic devices are often worn or carried by users and may be used to gather user health information or information regarding the user's environment (e.g., to analyze environmental factors or to make setting adjustments based on the environment). One way in which health information or environmental information may be determined is through optical sensors. In particular, a spectrometer may be used to determine wavelength and angle of incidence information of light incident on the device. The incident light may be ambient light or may be light emitted from the electronic device and reflected by an external object.

The spectrometer may be a single-shot alignment-free spectrometer with no moving parts. In particular, the spectrometer may include a diffractive member, such as a grating, to diffract the light based on its wavelength and angle of incidence. Moreover, the spectrometer may include an aperture. The aperture may be a coded aperture with light-blocking portions that only allow light at certain angles to pass through specific portions of the aperture. In other words, the aperture may further encode the light based on its wavelength and/or angle of incidence. The spectrometer may also include an image sensor to detect the light and generate spectrometer data after the light has passed through the diffractive member and the aperture.

Control circuitry within the electronic device may use the spectrometer data to determine the wavelength and angle of incidence of the incident light. In particular, the control circuitry may determine correlations between known spectral profiles of light and spectrometer measurements. These correlations may be based on physics of the spectrometer (e.g., the grating and aperture used) and the associated system response of the spectrometer to incident light. The correlations may be calculated and optimized by a deep neural network or other optimization technique. The control circuitry may use the determined correlations to calculate spectral profiles of incident light, including the wavelength and angle of incidence of the light, based on spectrometer measurements of unknown light. In this way, the spectrometer may determine the wavelength and angle of incidence of light in a single-shot, alignment-free process with no moving parts.

After the wavelength and angle of incidence are determined, control circuitry may determine health information, environmental, or food-related information based on the wavelength and angle of incidence and/or may adjust settings or modes of operation of the electronic device based on the wavelength and angle of incidence.

DETAILED DESCRIPTION

Electronic devices may include optical sensors to determine ambient light conditions or include optical sensors in combination with a light source to determine the amount of light reflected by a given medium. For example, electronic devices may include spectrometers to allow for detailed mapping of light, including the directionality of the light. Spectrometers may allow for accurate and detailed measurement of ambient light conditions (e.g., to allow for an adjustment of a display in the device in response to the ambient light conditions), may allow for health sensing for a user, such as oxygen-related sensing (e.g., pneumonia sensing or $VO_2$ sensing) or skin-related sensing (e.g., skin care or disease sensing), and/or may allow for chemical sensing, such as food-related sensing (e.g., calorie sensing or expiration condition sensing).

To allow for spectrometer sensing in a consumer electronic device, such as a portable electronic device, the spectrometer may be configured to determine light conditions, including the wavelength and angle of incidence of the light, in a single shot, with no need for alignment, and may have no moving parts. In this way, portable electronic devices may include spectrometers, which may provide for beneficial measurements of ambient light conditions, user health, and/or conditions of external objects, as examples. To perform these measurements, the spectrometer may be formed from grating and apertures structures, along with an image sensor. The image sensor may detect incident light, and processing circuitry may determine the light profile based on previously calculated or continuously calculated correlations between incident light measurements and light profiles. These correlations may be determined using a deep neural network (DNN).

Figure 1:
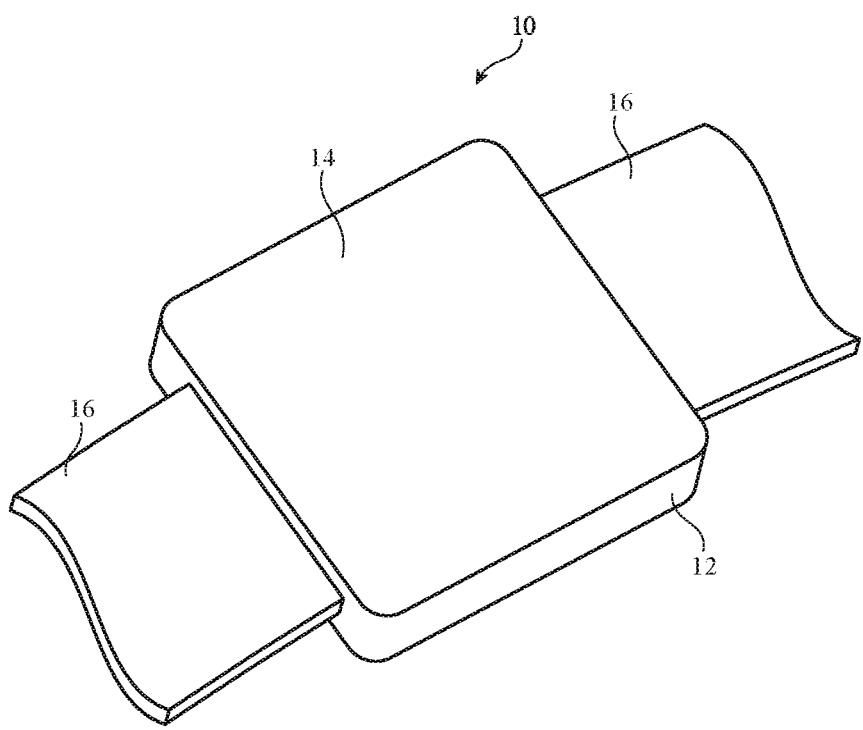
FIG. 1 is a drawing of an illustrative wearable electronic device in accordance with an embodiment.

In general, any suitable electronic devices may include spectrometers of this type. As shown in FIG. 1, a wearable electronic device 10, which may be a wristwatch device, may have a housing 12, a display 14, and a strap 16. The wristwatch may attach to a user's wrist via strap 16, and provide skin contact on the user's wrist, by which sensors within device 10 may measure signs of physical assertion, such as increased heart rate and perspiration. In some examples, optical sensors, such as spectrometers, may be used to determine a user's health, by performing sensing such as oxygen-related sensing and/or skin-related sensing. For example, the user's $VO_2$ (the user's volumetric flow of oxygen within the user's body) or the user's skin condition may be determined based on spectrometer measurements. These types of measurements may be performed using a spectrometer in combination with a light source that outputs light toward the user's skin. Reflections from the user's skin may be measured by the spectrometer, and known correlations between the measurements and health characteristics may be used to determine desired health conditions. Alternatively or additionally, a spectrometer may be used to measure ambient light conditions (e.g., without the use of an internal illumination source), and circuitry within the device may adjust display 14 or other components in device 10 in response to the ambient light measurements.

Figure 2:
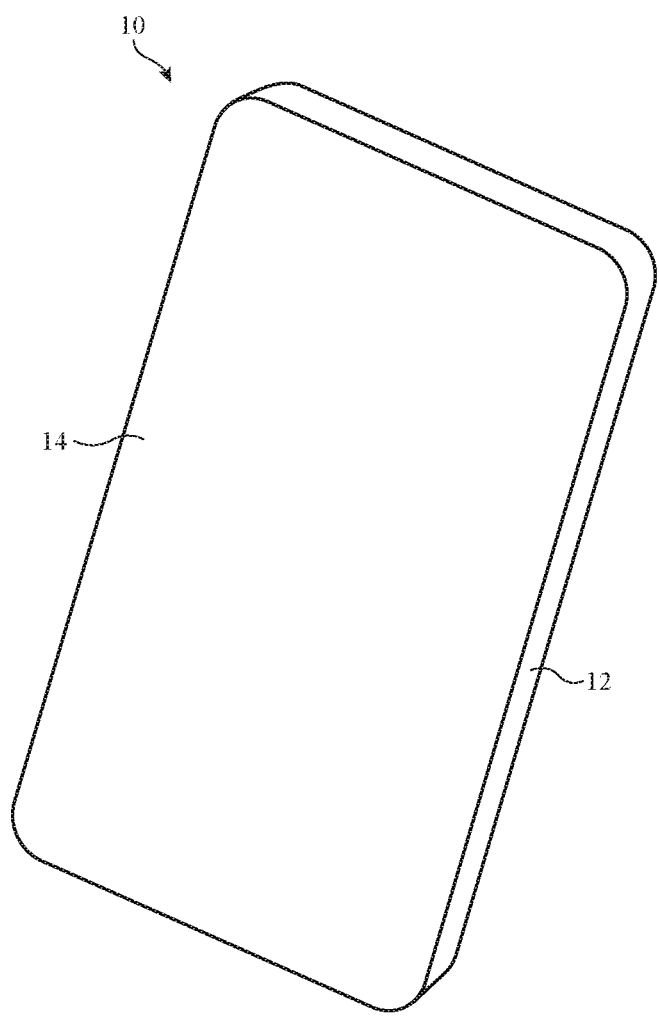
FIG. 2 is a drawing of an illustrative portable device in accordance with an embodiment.

Another illustrative device that may include a spectrometer is shown in FIG. 2. As shown in FIG. 2, a portable device 10, which may be a cellular telephone, for example, has housing 12 and display 14. Sensors within housing 12 may include optical sensors. The optical sensors may include one or more spectrometers to perform ambient light sensing, health sensing, or any other desired optical sensing. Although device 10 of the type shown in FIG. 2 may not be worn continuously on a user' wrist, like the device shown in FIG. 1, device 10 may detect health sensing when a user holds the device against their skin, as an example.

Figure 3:
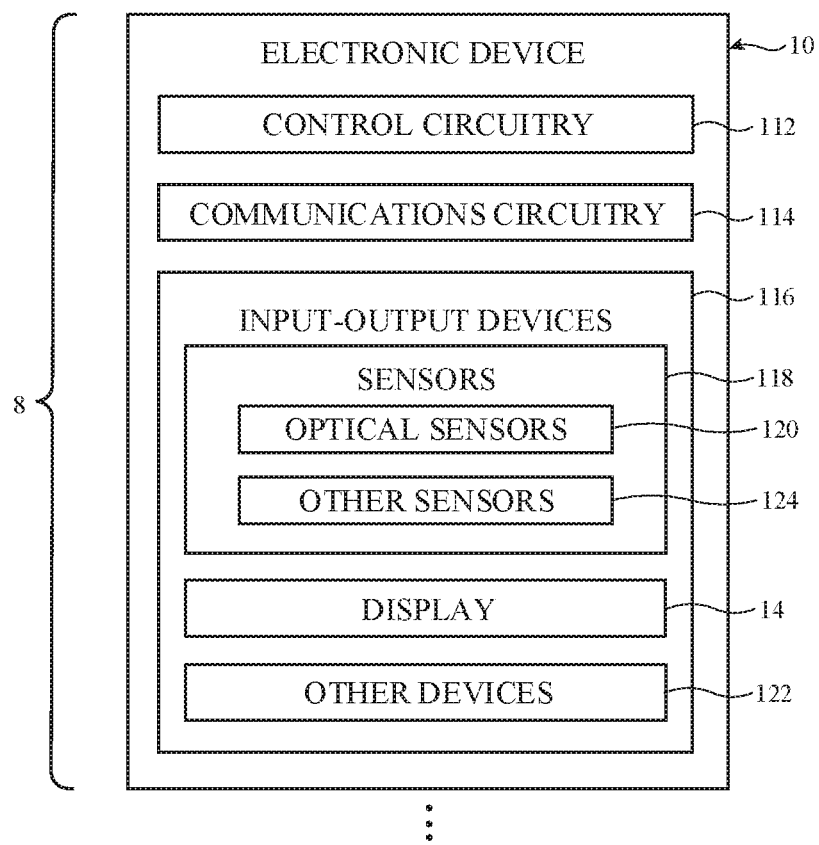
FIG. 3 is a diagram of an illustrative system of one or more electronic devices in accordance with an embodiment.

Although electronic device 10 may be used individually, it may also be used as part of a system of electronic device (e.g., a watch and phone may be used together). As shown in FIG. 3, electronic device 10, as well as additional electronic devices may be used in system 8, if desired. Device 10 may be, for example, a wristwatch device as shown in FIG. 1, or may be a cellular telephone, a media player, or other handheld or portable electronic device, a wristband device, a pendant device, a headphone, ear bud, or earpiece device, a head-mounted device such as glasses, goggles, a helmet, or other equipment worn on a user's head, or other wearable or miniature device, a navigation device, or other accessory, and/or equipment that implements the functionality of two or more of these devices. As examples, electronic device 10 may be an augmented reality (AR), virtual reality (VR), and/or mixed reality (MR) headset and/or handheld device. Illustrative configurations in which electronic device 10 is a portable electronic device such as a cellular telephone, wristwatch, or portable computer may sometimes be described herein as an example.

Additionally, system 8 may include any desired number of electronic devices. Additional electronic devices in system 8 may communicate with device 10 via communications circuitry 114, for example.

As shown in FIG. 3, electronic devices such as electronic device 10 may have control circuitry 112. Control circuitry 112 may include storage and processing circuitry for controlling the operation of device 10. Circuitry 112 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 112 may be based on one or more microprocessors, microcontrollers, digital signal processors, baseband processors, power management units, audio chips, graphics processing units, application specific integrated circuits, and other integrated circuits. Software code may be stored on storage in circuitry 112 and run on processing circuitry in circuitry 112 to implement control operations for device 10 (e.g., data gathering operations, operations involving the adjustment of the components of device 10 using control signals, etc.).

Electronic device 10 may include wired and wireless communications circuitry. For example, electronic device 10 may include radio-frequency transceiver circuitry 114 such as cellular telephone transceiver circuitry, wireless local area network transceiver circuitry (e.g., WiFi® circuitry), short-range radio-frequency transceiver circuitry that communicates over short distances using ultra high frequency radio waves (e.g., Bluetooth® circuitry operating at 2.4 GHz or other short-range transceiver circuitry), millimeter wave transceiver circuitry, and/or other wireless communications circuitry.

Device 10 may include input-output devices 116. Input-output devices 116 may be used to allow a user to provide device 10 with user input. Input-output devices 116 may also be used to gather information on the environment in which device 10 is operating. Output components in devices 116 may allow device 10 to provide a user with output and may be used to communicate with external electrical equipment.

In some embodiments, the sensors in one or more of the electronic devices in system 8 may be used to calibrate sensors in the other devices within system 8. For example, if electronic device 10 is a wearable electronic device and a second electronic device is a cellular telephone, optical sensors within one of the devices may be used to calibrate sensors in the other devices (e.g., by taking measurements in both devices and using those measurements to improve future measurements by one or both devices). However, this is merely illustrative. In general, any number of electronic devices in system 8 may generate data that may be communicated to other devices within system 8 and used to calibrate sensors within those other devices. In this way, the accuracy of the devices in the system may be improved, even when the devices are used individually at a later time.

As shown in FIG. 3, input-output devices 116 may include one or more optional displays such as displays 14. Displays 14 may be organic light-emitting diode displays or other displays with light-emitting diodes, liquid crystal displays, or other displays. Displays 14 may be touch sensitive (e.g., displays 14 may include two-dimensional touch sensors for capturing touch input from a user) and/or displays 14 may be insensitive to touch.

Input-output circuitry 116 may include sensors 118. Sensors 118 may include optical sensors 120 and other sensors 124. Optical sensors 120 may include spectrometers that measure ambient light to determine a profile of ambient light or that measure light reflected from an object to gather information about that object. Other optical sensors 120 and other sensors 124 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, optical sensors (e.g., spectrometers), a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors (e.g., a magnetometer), audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), health sensors that measure various biometric information (e.g., heartrate sensors, such as a photoplethysmography sensor), electrocardiogram sensors, and perspiration sensors) and/or other sensors.

User input and other information may be gathered using sensors and other input devices in input-output devices 116. If desired, input-output devices 116 may include other devices 122 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Similarly, other electronic devices in system 8 may have control circuitry, communications circuitry, and input-output devices. Input-output devices may include sensors, an optional display, and other devices. Control circuitry, communications circuitry, input-output devices, sensors, a display, and other devices may function similarly as described above in regards to the corresponding parts of electronic device 10. However, additional electronic devices in system 8 may have different configurations of control circuitry, different bands of communications circuitry, and different combinations of sensors, if desired.

During operation, the communications circuitry of the devices in system 8 (e.g., communications circuitry 112), may be used to support communication between the electronic devices. For example, one electronic device may transmit video data, audio data, and/or other data to another electronic device in system 8. Bluetooth circuitry may transmit Bluetooth advertising packets and other Bluetooth packets that are received by Bluetooth receivers in nearby devices. Electronic devices in system 8 may use wired and/or wireless communications circuitry to communicate through one or more communications networks (e.g., the internet, local area networks, etc.). The communications circuitry may be used to allow data to be transmitted to and/or received by device 10 from external equipment (e.g., a tethered computer, a portable device such as a handheld device or laptop computer, online computing equipment such as a remote server or other remote computing equipment, an accessory such as a hands-free audio system in a vehicle or a wireless headset, or other electrical equipment) and/or to provide data to external equipment.

During operation, devices 10 may transmit wireless signals such as Bluetooth signals or other short-range wireless signals and may monitor for these signals from other devices. For example, devices 10 may transmit Bluetooth signals such as Bluetooth advertising packets that are received by other devices 10. Transmitting devices 10 may sometimes be referred to as remote devices, whereas receiving devices 10 may sometimes be referred to as local devices. In transmitting Bluetooth advertisements (advertisement packets), each remote device may include information in the transmitted advertisements on the recent movement activity of that remote device and other information about the state of the remote device. User health information, information regarding the environmental conditions around device 10, and/or any other information may be gathered in one or more of devices 10, and may be shared over Bluetooth between devices. However, any desired protocol may be used to share information between devices in system 8, if desired.

During operation, devices 10 may use input-output devices 116, wireless circuitry such as satellite navigation system circuitry, and/or other circuitry in making measurements that are used in determining a device's motion context. For example, motion data from an accelerometer and/or an inertial measurement unit may be used to identify if a user's motions (e.g., repetitive up and down motions and/or other motions with a particular intensity, a particular cadence, or other recognizable pattern) correspond to walking, running, or cycling. If desired, location information from a satellite navigation system receiver may be used in determining a user's velocity and thereby determining whether a user is or is not walking, running, or cycling. In some arrangements, the frequency with which a user's cellular telephone transceiver links to different cellular telephone towers may be analyzed to help determine the user's motion. The user's frequency of linking to or receiving signals from different wireless local area network hotspots may also be analyzed to help determine the user's motion and/or other sensor information (e.g., altimeter readings indicating changes in altitude, etc.) may be gathered and processed to determine a user's activity. These techniques and/or other techniques may be used in determining motion context.

In addition to gathering and processing sensor data and other data indicative of the user's motion context, control circuitry 112 in device 10 may, if desired, monitor whether device 10 is wirelessly linked by a short-range wireless link (e.g., via Bluetooth) to handsfree audio systems in vehicles or other vehicle equipment known to be located in or associated with vehicles. In this way, the in-vehicle status of device 10 can be determined. For example, control circuitry 112 in a given device can determine whether the given device is preset in a vehicle or not based on whether circuitry 12 is or is not wirelessly linked with an in-vehicle hands-free system.

In addition to this presence-in-vehicle state information, control circuitry 112 can determine other information about the location of device 10. As an example, control circuitry 112 can conclude that a device is indoors if the device is linked by a short-range wireless link to in-home equipment (e.g., a set-top box, television, countertop speaker, in-home desktop computer, etc.) and can determine that the device is not indoors (and is therefore outdoors) if the device is not linked to this type of in-home equipment and, if desired, sensors in the device sense one or more additional indicators of presence in an outdoors environment such as bright sunlight, etc. In general, any suitable device status information (e.g. device context such as in-vehicle states, indoor-outdoor states, etc.) may be determined by devices 10 and can potentially be shared between devices, as appropriate.

In some embodiments, devices 10 (and/or other devices within system 8) may use a spectrometer to determine a light profile of ambient light or reflected light from internal light sources. A spectrometer may detect spectral information of the light, including the wavelength of the light and the incident angle of the light. For example, a spectrometer may receive the incident light through one or more windows within housing 12 of electronic device 10. The window(s) may be on a front face of housing 12 (e.g., the face with display 14), may be on an opposing rear face of housing 12, or may be on any other desired face of housing 12. In some embodiments, housing 12 may be formed from a transparent member, such as glass or sapphire, and have opaque masking structures, such as ink, thin-film interference filter layers, or other structures, to block light from entering portions of housing 12. The window in housing 12 may be formed as one or more openings in the opaque masking structures that allow light to pass to the underlying spectrometer. An example of a spectrometer that may be incorporated into device 10 is shown in FIG. 4.

Figure 4:
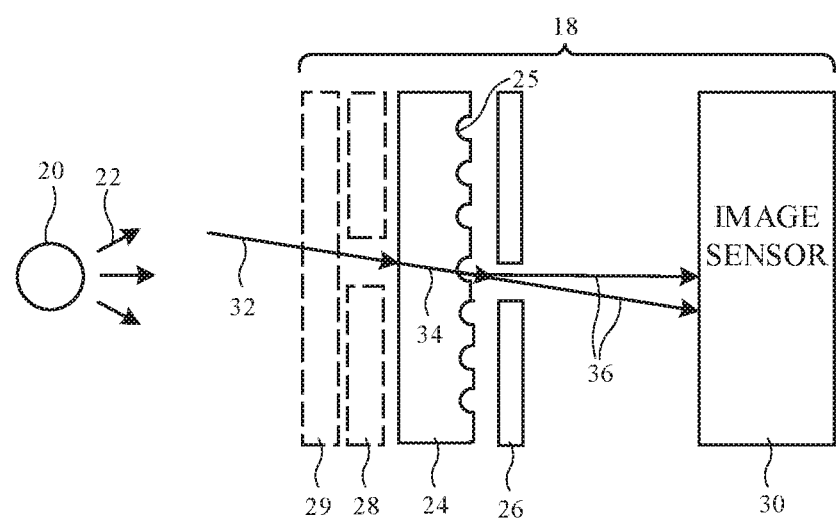
FIG. 4 is a diagram of an illustrative spectrometer in accordance with an embodiment.

As shown in FIG. 4, spectrometer 18 may include grating 24, aperture 26, and image sensors 30. Spectrometer 18 may receive light 22 from light source 20. Light source 20 may be an ambient light source, and light 22 may be ambient light. Alternatively or additionally, light source 20 may be a light source internal to device 10 that emits light toward an external object (e.g., a user's skin), and light 22 may be light that is reflected off of that object. For example, light source 20 may emit light out of the window within housing 12 toward the external object. Generally, light 22 may be light of any wavelength, including visible light, near-infrared light, infrared light, or any other wavelength of light. In any case, light 22 may reach spectrometer 18 as light 32 (e.g., light 22 may enter device 10 through one or more windows in housing 12). Light 32 may refract while entering grating 24 to form light 34, which in turn may be diffracted by diffraction structures 25 of grating 24 upon exit, forming light 36. Light 36 may pass through aperture 26 before reaching image sensor 30. Image sensor 30 may detect light 36. For example, light sensor 30 may include an array of image sensor pixels that each detect the intensity of light at a given pixel location in the array. In this way, the intensity and location of light 36 may be measured by image sensor 30.

Image sensor 30 may be a complementary metal-oxide-semiconductor type image sensor or may be any other type of image sensor. Image sensor 30 may include a two-dimensional array of image sensor pixels or may include a one-dimensional array of image sensor pixels, as desired.

Grating 24 may include diffraction structures 25, which may be recesses on the light exit surface of the grating substrate. However, this is merely illustrative. In general, diffraction structures 25 may be any desired structures, such as protrusions, recesses, and/or additional structures on the exit or input surface of the grating substrate. Moreover, although recesses 25 are shown as having a hemispherical shape in FIG. 4, diffraction structures 25 may have any desired shape.

In general, grating 24 may diffract light 32 in a spectrally and angularly dependent manner. In other words, grating 24 may diffract light of different wavelengths to different degrees (e.g., may diffract higher wavelength light to a greater extent than lower wavelength light) and may diffract light that enters grating 24 at different angles to different degrees (e.g., may diffract light that enters at a higher angle to a greater extent than light that enters at a lower angle). In this way, grating 24 may diffract light at different angles based on the wavelength and the entry angle of the light, splitting the light into different rays 36 before it reaches image sensor 30.

Although grating 24 has been shown and described as a grating, this is merely illustrative. In general, any diffractive component or member that separates light into its spectral components and based on its angle of incidence may be used. For example, a prism or photonic crystal may be used.

Aperture 26 may mix and encode the components of light that have been separated by grating 24. Generally, aperture 26 may ensure that only some light that has been diffracted by grating 24 reaches image sensor 30. Aperture 26 may be designed to allow only light of interest in determining the light source profile (e.g., the opening in aperture 26 may be positioned to allow the desired light through and block the remaining light). Moreover, depending on the type of aperture used, aperture 24 may encode the light that exits grating 24 such that it reaches image sensor 30 in a desired manner. In one example, aperture 24 may be a coded or patterned aperture, that blocks light at certain angles/locations to ensure that certain pixels of image sensor 30 receive specific light components (e.g., the aperture may be coded to ensure that high angle, high wavelength light only reaches a first set of pixels of image sensor 30 and to ensure that low angle, low wavelength light only reaches a second set of pixels of image sensor 30). However, this is merely illustrative. In general, aperture 26 may be designed in any desired manner.

Although aperture 26 is shown between grating 24 and image sensor 30, this is merely illustrative. If desired, aperture 26 may be in position 28, with grating 24 interposed between the aperture and image sensor 30. Positioning aperture 26 in position 28 may allow specific light through to grating 24 (e.g., undesired light may be blocked prior to passing through grating 24). In some cases, spectrometer 18 may have aperture 26 in both locations (e.g., in position 28 and the position of aperture 26 in FIG. 4). If multiple apertures are used, they may have the same designs or may have different designs, as desired.

Additionally, spectrometer 18 may include one or more optional optical components 29. For example, optional optical components 29 may include a collimator that overlaps grating 24 and aperture 26 to collimate light 22/32 prior to the light reaching grating 24. In this way, collimator 29 may ensure that more light reaches grating 24 and aperture 26 to be diffracted, encoded, and sensed by image sensor 30. Although collimator 29 is shown as overlaying aperture position 28, this is merely illustrative. Collimator 29 may be between an aperture and grating 24, or in any other desired position within spectrometer 18. Additionally or alternatively, optional optical components 29 may include one or more lenses, such as a Fresnel lens, a micro lens, a spherical lens, or any other desired lens. In general, any desired optical components may be included in optional optical components 29.

Figure 5:
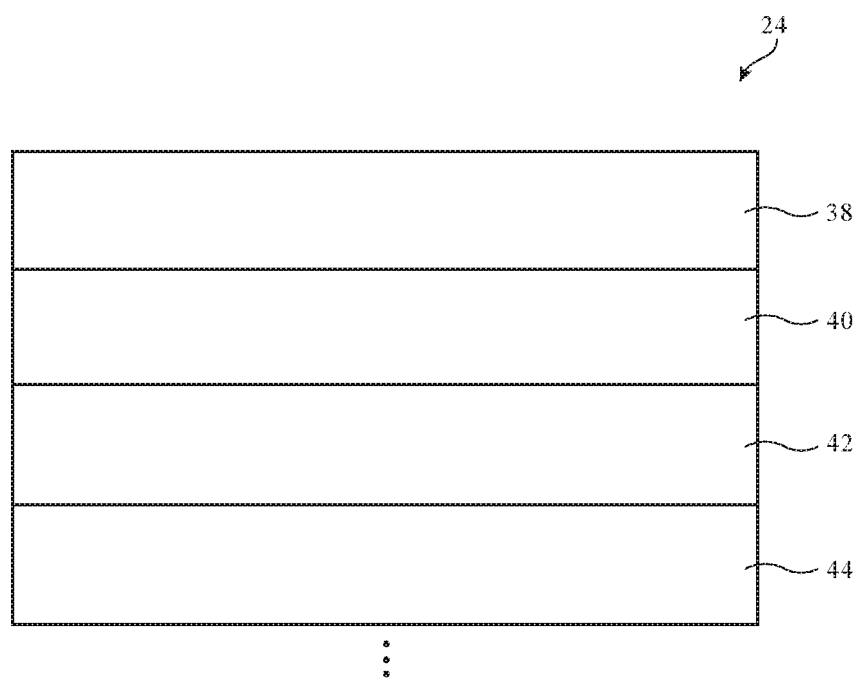
FIG. 5 is a diagram of an illustrative grating for a spectrometer in accordance with an embodiment.

A detailed example of grating 24 is shown in FIG. 5. As shown in FIG. 5, grating 24 may include multiple diffractive layers 38, 40, 42, and 44. Although grating 24 is shown as including four diffractive layers, this is merely illustrative. Grating 24 may include one diffractive layer, more than one diffractive layer, more than three diffractive layers, less than five diffractive layers, or any other desired number of diffractive layers.

Each diffractive layer 38-44 may have diffractive structures, including protrusions, recesses, and/or embedded particles or cavities, as desired. These structures may be formed on any desired surface of each layer or may be formed within each layer.

Moreover, grating 24 may have one or more layers with any desired groove densities (e.g., the spacing between diffractive structures on or in the layers). For example, layers 38, 40, 42, and/or 44 may have more than 100 grooves/mm, more than 250 grooves/mm, fewer than 500 grooves/mm, 600 grooves/mm or more, 900 grooves/mm, or any other desired groove density. Although the spacing is referred to as grooves/mm, the spacing may be between any desired diffractive structures, and may be referred to as structures/mm. In one example, each of layers 38, 40, 42, and 44 may have different groove densities. However, this is merely illustrative. In general, grating 24 may be formed using any desired number of diffractive layers, and each of the diffractive layers may have any desired groove density. Additionally or alternatively, if grating 24 includes other diffractive structures, such as photonic crystals, different densities or designs may be used. For example, the density of the photonic crystals within the grating substrate may be varied, and one or more layers with photonic crystals may be used, as desired.

In general, grating 24 may be designed in any desired manner to encode the light incident on the grating before it reaches image sensor 30. In other words, grating 24 may separate the light, such as light 32 in FIG. 4 according to its wavelength and angle of incidence, thereby creating an encoded photon signal that includes information on the wavelength and angle of incidence of the light.

Figure 6A:
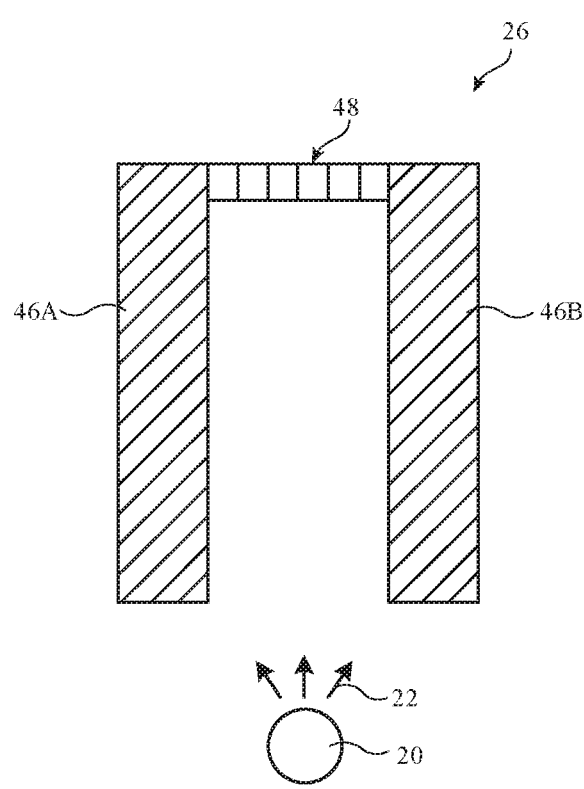
FIG. 6A is a diagram of an illustrative single-slit aperture for a spectrometer in accordance with an embodiment.
Figure 6B:
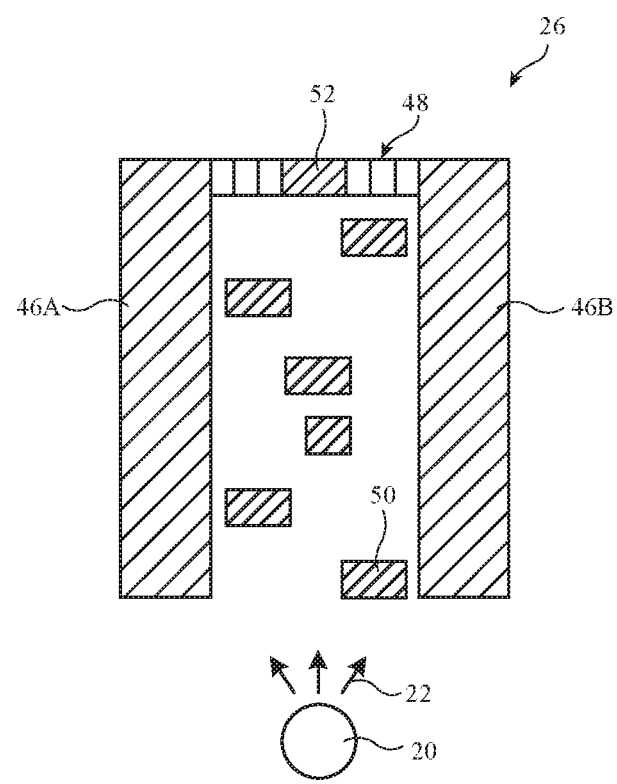
FIG. 6B is a diagram of an illustrative coded aperture for a spectrometer in accordance with an embodiment.

Detailed examples of aperture 26 are shown in FIGS. 6A and 6B. As shown in FIG. 6A, light 22 from light source 20 may be incident on aperture 26 (e.g., either before reaching grating 24 if in position 28 of FIG. 4 or after being encoded by grating 24 if positioned in position 26 of FIG. 4). Aperture 26 of FIG. 6A is a single-slit aperture, with light-blocking portions 46A and 46B. For example, light-blocking portions 46A and 46B may block high angle light that is not desirable to reach image sensor 30. Some of the light may pass through the region between light-blocking portions 46A and 46B, reaching the end of the aperture in pattern 48 (e.g., pattern 48 may be incident on image sensor 30). Because aperture 26 is a single-slit aperture in this example, pattern 48 may be uniform across the pixels of image sensor 30. In other words, the light may reach different pixels based on its wavelength and angle of incidence (due to the encoding provided by grating 24), but it will otherwise pass mostly unimpeded to image sensor 30, other than the blocking of some high-angle, undesirable light by portions 46A and 46B. In some cases, however, it may be desirable to further encode the light as it passes through aperture 26. An example of a coded aperture is shown in FIG. 6B.

As shown in FIG. 6B, aperture 26 may include light-blocking portions 46A and 46B, and may additionally have internal light-blocking portions 50. Internal light-blocking portions 50 may further encode the light as it passes through aperture 26. For example, internal-light blocking portions 50 may block some angles of light to ensure that pattern 48 that is detected by image sensor 30 provides different information for each pixel or row of pixels in the image sensor. As shown in FIG. 6B, pattern 48 may have blocked portion 52, which illustrates that light from certain angles may only reach some of the underlying image sensor pixels. In this way, the light may be further encoded, and determining which image sensor pixels detect light may provide more information about the wavelength and angle of incidence of the incident light.

Although the arrangement of FIG. 6B shows a two-dimensional coded aperture, this is merely illustrative. If desired, a three-dimensional coded aperture (e.g., an aperture with internal light-blocking structures that are spaced differently in three directions) may be used. In general, any desired aperture may be used, and any light-blocking structures may be included on the outer portions or internal portions of the aperture.

In general, light-blocking portions 46A, 46B, and 50 may be formed from any desired material. For example, opaque polymer, material painted with black paint or ink, or any other desired material or combination of material may be used. This material may absorb a majority of incident light. However, the material may also reflect and/or transmit a desired portion of the light, if desired Because grating 24 and/or aperture 26 of FIG. 4 encode the light before it reaches image sensor 30, the resulting measurements by image sensor 30 include information regarding the wavelength and incident angle of the light. As a result, a wavelength and angle of incidence of the incident light may be determined by spectrometer 18 using a single-shot (e.g., a single measurement using image sensor 30), alignment-free process (e.g., grating 24, aperture 26, and other components of spectrometer 18 do not need to be aligned prior to taking measurements), with no moving parts. This relationship may be given by Equation 1, $$y=Ax \qquad (1)$$

where y is a measurement taken by image sensor 30 (also referred to as spectrometer data herein), A is the system response (e.g., the effect of grating 24 and aperture 26 on the light), and x is the profile of light, including the wavelength and angle of incidence of the light, incident on spectrometer 18. As discussed, sensor measurement y may correspond to the array of data measured by the pixels in image sensor 30. System response A may be determined by using known light sources (e.g., light sources with a known angle and wavelength) and measuring the response with image sensor 30. System response A may be measured in a controlled environment and/or may be continuously updated when spectrometer 18 is within an electronic device. For example, system response A may be updated when the electronic device is exposed to known light conditions.

Although spectrometer 18 has been described as having no moving parts, this is merely illustrative. If desired some of the components within spectrometer 18 may move, if desired. For example, such as grating 24 some components may move or rotate. This may provide additional information regarding the angle of incidence of the light measured by the spectrometer (i.e., the directionality of the light), and allow for additional accuracy in spectrometer measurements.

In either case, once A is measured, any desired method of solving an undetermined linear system may be used in conjunction with measurements of image sensor 30 to determine the wavelength and angle of incidence of incident light. One example of a method that may be used to solve this system is shown in FIGS. 7 and 8.

Figure 7:
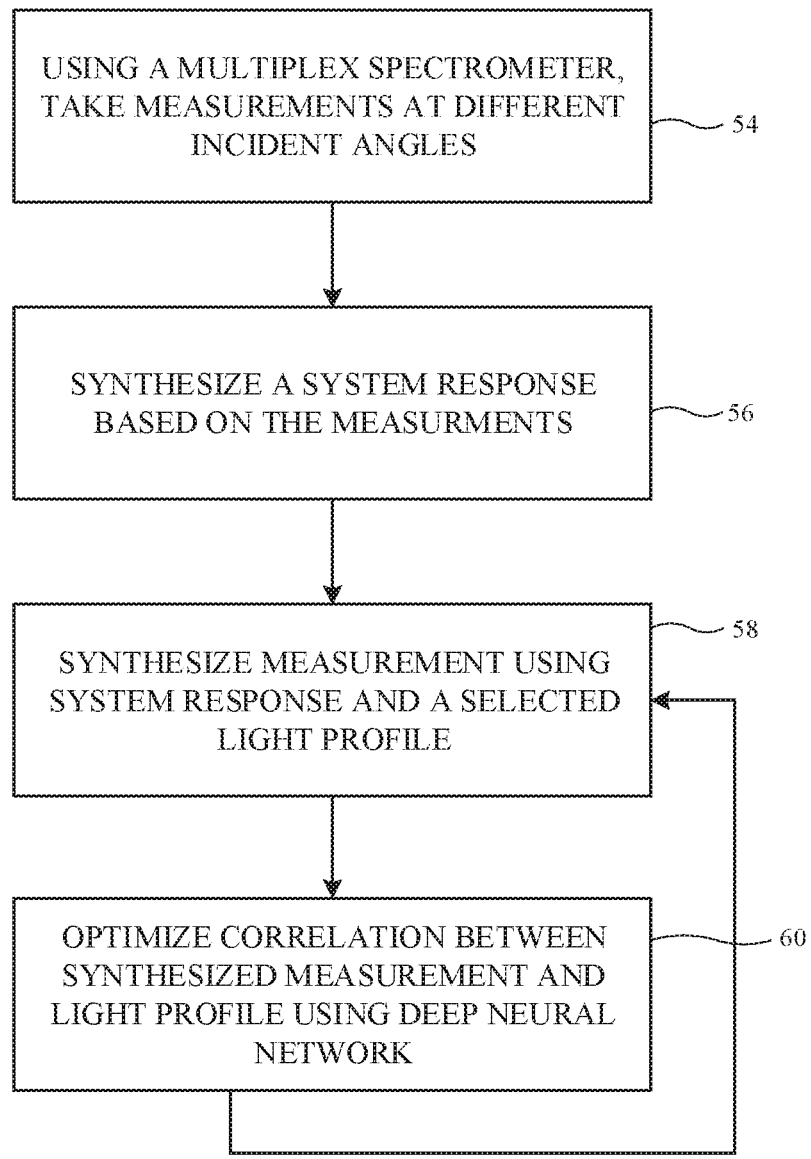
FIG. 7 is a flowchart of illustrative steps used to determine and optimize correlations between spectrometer measurements and incident light profiles in accordance with an embodiment.
Figure 8:
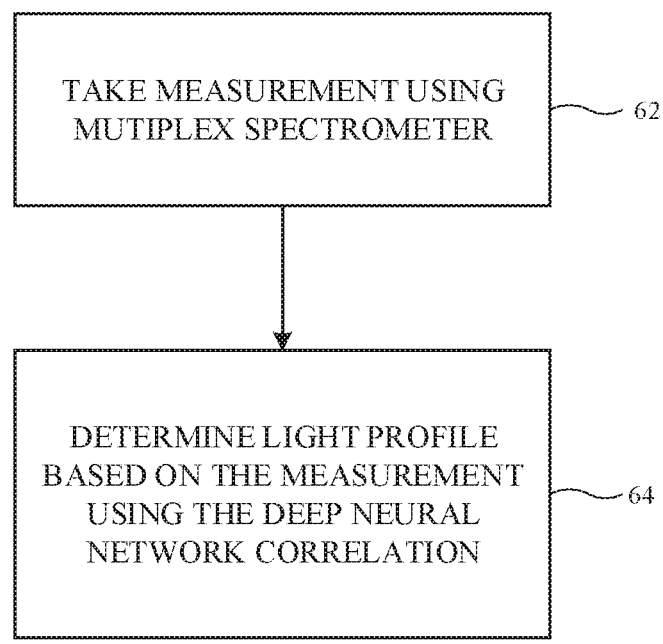
FIG. 8 is a flowchart of illustrative steps used to determine an incident light profile using a spectrometer measurement and determined correlations in accordance with an embodiment.

As shown in FIG. 7, at step 54, a multiplexed spectrometer, such as spectrometer 18 of FIG. 4, may take optical measurements at various incident angles. In particular, image sensor 30 may generate image data in response to light that passes through grating 24 and aperture 26 at a variety of different angles. If desired, these measurements may be performed using a light source having a known wavelength. By repeatedly taking different measurements at different angles, the system response based on wavelength may be determined. Moreover, these measurements may be performed at known incident angles using different light sources (e.g., different light sources having known wavelengths). In this way, image sensor 30 may generate image sensor data for different wavelengths and incident angles.

At step 56, circuitry, such as control circuitry 112 of FIG. 3 (or any other desired circuitry) may synthesize system response A based on the measurements taken by image sensor 30. In particular, because image sensor 30 generated measurements at different wavelengths and incident angles, one or more system response matrices A may be determined. For example, a matrix with relations between the angle of incidence of the light and the image sensor response may be determined for each light source used. In this way, system responses for a library of light sources may be compiled.

At step 58, circuitry, such as control circuitry 112 of FIG. 3 (or any other desired circuitry), may synthesize a measurement value (i.e., the y value of Equation 1) using the system responses synthesized at step 56 and known light source profiles (e.g., a library of light sources).

At step 60, a deep neural network (DNN) may be used to optimize the correlation between the synthesized measurement (y value in Equation 1) and the respective light source (x value in Equation 1). For example, the deep neural network may compare the synthesized measurement with the value measured by image sensor 30 for that light source and optimize the system response A to improve the correlation between the two. In this way, the system response (A value in Equation 1 and the correlation between y and x) may be improved through DNN optimization. Using steps 54-60, the DNN may be trained to determine and optimize correlations between known light source profiles (x) and spectrometer measurements (y).

Steps 58 and 60 may be completed continuously until the correlation between a light source profile and spectrometer measurement are known within desired accurately. Moreover, steps 54-60 may be completed for any desired light sources. Steps 54-60 may be completed one time (e.g., before the spectrometer is placed into an electronic device, or may be performed continuously while in an electronic device (e.g., may be performed to improve correlations between light sources and measurements while the device is being used or carried and exposed to a known light source). In this way, the deep neural network may be trained using steps 54-60 to improve correlations between spectrometer measurements and incident light profiles (e.g., trained in solving Equation 1). In either case, after correlations between light source profiles and spectrometer measurements are known, spectrometer 18 may be used to determine light information of unknown light sources. A process illustrating steps to determine unknown light source information is shown in FIG. 8.

As shown in FIG. 8, at step 62, spectrometer 18 may take a measurement of light incident on the spectrometer. For example, image sensor 30 may generate image data in response to light that has passed through grating 24 and aperture 26. The measured light may be ambient light or may be reflected light that was previously emitted by a light source within the electronic device (e.g., light that was reflected off of an external object). The light profile, whether ambient light or reflected light, is of an unknown wavelength and incidence angle.

At step 64, circuitry, such as control circuitry 112 of FIG. 3 (or any other desired circuitry) may determine a light profile of the ambient or reflected light based on the measurement. In particular, the deep neural network may determine the wavelength and angle of incidence of the incident light based on the deep neural network correlation determined at step 60 of FIG. 7. In this way, a wavelength and angle of incidence of the incident light may be determined by spectrometer 18 using a single-shot (e.g., a single measurement using image sensor 30), alignment-free process (e.g., grating 24, aperture 26, and other components of spectrometer 18 do not need to be aligned prior to taking measurements), with no moving parts. Additionally, the light source type may be approximated (e.g., if ambient light is being measured) based on the deep neural network correlation used (as each of the correlations may be based on a known light source in a library of light sources).

Using a deep neural network to determine correlations between light sources and spectrometer measurements and to determine a spectral profile based on a spectrometer measurement may allow for high-speed measurements. For example, the deep neural network may determine a spectral profile using a spectrometer measurement in under one second. However, any length of time may be used, as desired.

Although the use of a deep neural network and the resulting correlations between light profiles and measurements has been described as a method by which spectrometer 18 may measure the wavelength and angle of incidence of light, any desired method of determining a correlation between the spectrometer measurement and light profile may be used (e.g., solving Equation 1). For example, optimization techniques minimizing the difference between Ax (the system response multiplied by the light profile) and y (the spectrometer measurement) of Equation 1 may be used.

After the light profile, including the wavelength and angle of incidence, has been determined at step 64, circuitry within electronic device 10 may take any desired action based on the light profile. For example, if ambient light is measured by spectrometer 18, display settings of display 14, such as the white point, color cast, brightness, or any other desired display settings. In another example, if reflected light is measured by spectrometer 18, circuitry in device 10 may use the data to determine health information (e.g., oxygen-related information or skin-related information) or to determine food-related information and then store that information in memory circuitry within device 10. After the health information and/or food-related information has been determined, this information may be logged within memory in device 10, if desired. However, these examples are merely illustrative. In general, any suitable action may be taken in response to determining the light profile. Moreover, the light profile determined using spectrometer may be combined with other optical information, as shown in FIG. 9.

Figure 9:
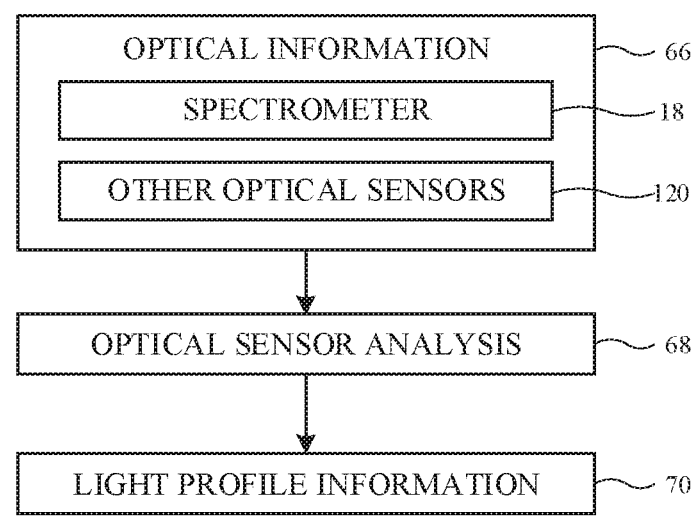
FIG. 9 is an illustrative diagram of optical information obtained by a spectrometer and other sensors and its use in determining light profile information in accordance with an embodiment.

As shown in FIG. 9, optical information 66 may include information determined using spectrometer 18, including the wavelength, angle of incidence, and/or light source type of incident light. As discussed, spectrometer 18 may make measurements of the incident light using image sensor 30, and circuitry within device 10 may determine the light profile information based on the spectrometer measurements. Optical information 66 may also include information from other optical sensors 120. Optical sensors 120 may include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, optical sensors (e.g., spectrometers), an optical sensor used in conjunction with a light source that emits one or more beams of light that are tracked using the image sensor after reflecting from a user's eyes), an ambient light sensor, or any other desired optical sensor.

Circuitry within device 10, such as control circuitry 112, may analyze optical information 66. In particular, control circuitry 112 may use correlations between known light profiles and spectrometer measurements to determine light profile information 70. Alternatively or additionally, control circuitry 112 may use information from other optical sensors 120 to calculate or validate light profile information 70. For example, image data may be generated by a camera within electronic device 10, and the image data may be used in conjunction with the data from spectrometer 18 to determine light profile information 70.

Moreover, optical information 66 may be used to further train the deep neural network (or other solving system) using the process described in FIG. 7. For example, circuitry 112 may use optical information gathered from one or more of spectrometer 18 and other optical sensors 120 to further optimize correlations between light profiles and spectrometer measurements.

After light profile information 70 has been determined, control circuitry 112 may adjust one or more settings or operating modes of device 10 based on light profile information 70 and/or optical information 66. For example, display settings of display 14, such as the white point, color cast, brightness, or any other desired display settings may be changed based on light profile information 70 and/or optical information 66. Alternatively or additionally, settings of an optical sensor, such as a camera, may be adjusted in response to light profile information 70. Moreover, if electronic device 10 is a head-mounted device or handheld device that overlays information on real-world images (e.g., an augmented reality device or a virtual reality device), light profile information 70 and/or optical information 66 may be used to adjust shadowing in the displayed images (e.g., to match the shadowing in the light profile of the ambient light). However, these setting and operating mode adjustments are merely illustrative. In general, control circuitry 112 may change any desired setting and/or operating mode of device 10.

Additionally, circuitry in device 10 may use light profile information 70 and/or optical information 66 to determine health information (e.g., oxygen-related information or skin-related information) or to determine food-related information and then store that information in memory circuitry within device 10. However, these examples are merely illustrative. In general, any suitable action may be taken in response to determining the light profile.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

| Table of Reference Numerals | | | |
|---|---|---|---|
| 10 | Electronic Device | 12 | Housing |
| 14 | Display | 16 | Watch Band |
| 8 | System | 112 | Control Circuitry |
| 114 | Communications Circuitry | 116 | Input-Output Devices |
| 118 | Sensors | 120 | Optical Sensors |
| 124 | Other Sensors | 14 | Display |
| 122 | Other Devices | 18 | Spectrometer |
| 20 | Light Source | 22 | Light |
| 24 | Grating | 25 | Diffraction Structures |
| 26 | Aperture | 28 | Alternative Aperture Position |
| 29 | Optical Components | 30 | Image Sensor |
| 32 | Incident Light | 34 | Light Within the Grating |
| 36 | Diffracted Light | 38, 40, 42, 44 | Diffractive Layers |
| 46A, 46B | Light-Blocking Portions | 48 | Pattern |
| 50 | Internal Light-Blocking Portions | 52 | Blocked Portion |
| 54, 56, 58, 60 | Deep Neural Network Training Steps | 62, 64 | Light Profile Determination Steps |
| 66 | Optical Information | 68 | Optical Sensor Analysis |
| 70 | Light Profile Information | | |

What is claimed is:

1. A portable electronic device comprising:
a housing having a window;
a display mounted in the housing;
a spectrometer in the housing and configured to produce spectrometer data in response to incident light that passes through the window in the housing, wherein the incident light has a wavelength and an angle of incidence and wherein the spectrometer comprises:
a diffractive member that diffracts the incident light based on the wavelength and the angle of incidence,
an aperture through which the incident light passes, and
an image sensor that generates the spectrometer data; and
control circuitry configured to determine the wavelength and the angle of incidence of the incident light based on the spectrometer data.

2. The portable electronic device defined in claim 1 wherein the incident light is ambient light and wherein the control circuitry is configured to adjust at least one display setting of the display based on the wavelength and the angle of incidence of the ambient light.

3. The portable electronic device defined in claim 2 wherein the at least one display setting is selected from the group of settings consisting of: brightness, white point, and color cast.

4. The portable electronic device defined in claim 1 further comprising a light source mounted in the housing configured to emit light that is reflected by an external object and wherein the incident light is the light reflected by the external object.

5. The portable electronic device defined in claim 4 wherein the control circuitry is configured to determine information based on the wavelength and the angle of incidence of the light reflected by the external object and wherein the information is selected from the group consisting of: oxygen-related information, skin-related information, or food-related information.

6. The portable electronic device defined in claim 1 wherein the spectrometer is a single-shot, alignment-free spectrometer with no moving parts.

7. The portable electronic device defined in claim 6 wherein the control circuitry comprises a deep neural network that determines the wavelength and angle of incidence of the incident light in response to the spectrometer data.

8. The portable electronic device defined in claim 1 wherein the diffractive member is a grating comprising a plurality of diffractive layers.

9. The portable electronic device defined in claim 8 wherein each diffractive layer of the plurality of diffractive layers comprises a set of diffraction structures on a surface of the respective diffractive layer and wherein each set of diffraction structures has a different density than the other sets of diffraction structures.

10. The portable electronic device defined in claim 8 wherein the aperture is a single-slit aperture having first and second portions that are configured to block the incident light and a central portion between the first and second portions that is configured to pass the incident light.

11. The portable electronic device defined in claim 8 wherein the aperture is a coded aperture having first and second outer portions that are configured to block the incident light, a central portion between the first and second portions that is configured to pass the incident light, and a plurality of internal light-blocking structures in the central portion that encode the light before it reaches the image sensor.

12. The portable electronic device defined in claim 11 wherein the aperture is interposed between the grating and the image sensor and wherein the aperture encodes the light diffracted by the grating.

13. The portable electronic device defined in claim 11 wherein the grating is interposed between the aperture and the image sensor and wherein the grating receives the encoded light from the coded aperture.

14. The portable electronic device defined in claim 11 wherein the spectrometer further comprises a collimator interposed between the grating and the window in the housing.

15. A method of determining a wavelength and angle of incidence of incident light with a portable electronic device, the method comprising:
 with a spectrometer, taking measurements of light emitted by known light sources at known incidence angles;
 using control circuitry, training a deep neural network to determine correlations between the known light sources at the known incidence angles and the spectrometer measurements;
 taking a measurement of the incident light using the spectrometer; and
 determining the wavelength and the angle of incidence of the incident light using the deep neural network correlation.

16. The method defined in claim 15 wherein training the deep neural network comprises:
 synthesizing a system response in response to the spectrometer measurements;
 synthesizing a measurement using the system response and a selected light profile that corresponds to the light emitted by one of the known light sources; and
 optimizing a correlation between the synthesized measurement and the selected light profile using the deep neural network.

17. The method defined in claim 16 wherein taking the measurement of the incident light using the spectrometer comprises taking the measurement of ambient light, the method further comprising:
 with the control circuitry, adjusting a setting of a display based on the determined wavelength and angle of incidence of the ambient light.

18. The method defined in claim 17 further comprising:
 taking additional measurements of the ambient light using at least one additional optical sensor, wherein adjusting the setting of the display comprises adjusting the setting of the display based on the determined wavelength of incidence of the ambient light and the additional measurements of the ambient light.

19. The method defined in claim 16 further comprising:
 with a light source, emitting light toward an external object, wherein taking a measurement of the incident light using the spectrometer comprises taking the measurement of light reflected off of the external object; and
 with the control circuitry, determining health information based on the determined wavelength and angle of incidence of the reflected light.

20. A portable electronic device configured to measure a light profile of incident light, the portable electronic device comprising:
 a housing;
 a single-shot alignment-free spectrometer with no moving parts in the housing, wherein the spectrometer is configured to produce spectrometer data in response to the incident light and wherein the spectrometer comprises:
  a grating that diffracts the incident light based on a wavelength and an angle of incidence of the incident light,
  a coded aperture that encodes the diffracted incident light, and
  an image sensor that produces the spectrometer data; and
 control circuitry that determines the wavelength and the angle of incidence of the incident light based on correlations between known light sources and the spectrometer data.

* * * * *